United States Patent
Ginis (10) Patent No.: US 7,756,925 B2
(45) Date of Patent: Jul. 13, 2010

(54) METHODS AND APPARATUS FOR EFFICIENTLY PLACING STREAM TRANSFORMS AMONG BROKER MACHINES COMPRISING AN OVERLAY NETWORK IN A PUBLISH-SUBSCRIBE MESSAGING SYSTEM

(75) Inventor: Roman Ginis, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 12/053,148

(22) Filed: Mar. 21, 2008

(65) Prior Publication Data

US 2008/0177880 A1    Jul. 24, 2008

Related U.S. Application Data

(63) Continuation of application No. 11/077,823, filed on Mar. 10, 2005, now abandoned.

(51) Int. Cl.
*G06F 15/16* (2006.01)
(52) U.S. Cl. .................................................. 709/204
(58) Field of Classification Search ................. 709/204
See application file for complete search history.

(56) References Cited

U.S. PATENT DOCUMENTS

| | | | |
|---|---|---|---|
| 6,643,682 B1 * | 11/2003 | Todd et al. ................... | 709/202 |
| 6,799,147 B1 | 9/2004 | Balasubramanian et al. | 709/186 |
| 7,136,899 B1 * | 11/2006 | Campailla ................... | 709/206 |
| 2004/0003064 A1 | 1/2004 | Astley et al. ................. | 709/223 |
| 2005/0021622 A1 * | 1/2005 | Cullen ......................... | 709/204 |
| 2005/0251811 A1 | 11/2005 | Ginis et al. .................. | 719/313 |

OTHER PUBLICATIONS

Ginis, R., "On Placement of Stream-Transforms in a Distributed Publish-Subscribe System", Proceedings of the 30$^{th}$ VLDB Conference, Toronto, Canada, 2004, 7 pgs.
Karypis, G. et al., "A Software Package for Partitioning Unstructured Graphs, Partitioning Meshes, and Computing Fill-Reducing Orderings of Sparse Matrices", Version 4.0, Sep. 20, 1998, 43 pgs.
Hendrickson, B. et al., "The Chaco User's Guide", Version 2.0, Jul. 1995, 44 pgs.

\* cited by examiner

*Primary Examiner*—Benjamin R Bruckart
*Assistant Examiner*—Farhad Ali
(74) *Attorney, Agent, or Firm*—Harrington & Smith (57) ABSTRACT

The methods and apparatus of the present invention operate in publish-subscribe messaging systems including at least publishing clients, subscribing clients and a plurality of broker machines. The broker machines form an overlay network responsible for receiving input messages from publishing clients, transforming information contained in the input messages according to pre-determined transformation specifications, and transmitting output messages containing the transformed information to the subscribing clients. The pre-determined transformation specifications are reduced to information transforms implemented as software modules that are distributed among the broker machines. The present invention provides methods and apparatus for placing transforms among the broker machines comprising the overlay network in such a way that the latency and throughput of messaging activities executed by the broker machines of the overlay network is improved.

29 Claims, 8 Drawing Sheets

METHODS AND APPARATUS FOR EFFICIENTLY PLACING STREAM TRANSFORMS AMONG BROKER MACHINES COMPRISING AN OVERLAY NETWORK IN A PUBLISH-SUBSCRIBE MESSAGING SYSTEM

CROSS REFERENCE TO RELATED APPLICATION

This application is a continuation of U.S. patent application Ser. No. 11/077,823 filed Mar. 10, 2005 now abandoned.

TECHNICAL FIELD

The present invention generally concerns methods and apparatus for use in distributing information transforms implemented as software modules among broker machines comprising an overlay network operating in a publish-subscribe messaging system, and more particularly concerns methods and apparatus for improving throughput and latency in publish-subscribe messaging systems having an overlay network of broker machines by efficiently distributing information transforms among broker machines.

BACKGROUND

A publish-subscribe middleware messaging system may comprise, for example, publishing clients, message service providers, subscribing clients and a plurality of broker machines. The plurality of broker machines constitute an overlay network responsible for managing messaging activities occurring between and among the publishing clients, message service providers and subscribing clients. Publishing clients generate input messages (also called events) which contain one or more topics and data content, and submit them to the overlay network of broker machines. The broker machines perform transforms on information contained in the input messages generated by the publishing clients according to pre-determined specifications, thereby transforming the input messages to output messages. The information transformations are implemented as one or more software modules that are distributed among the broker machines comprising the overlay network. The output messages containing the transformed information are then delivered to the subscribing clients. The pre-determined specifications are typically created by message service providers who know the form and content of information that is of interest to clients subscribing to their messaging services.

Publish-subscribe middleware messaging systems frequently operate in an anonymous manner, meaning that publishing clients may not know how many subscribing clients there are or where they are, and similarly subscribing clients may not know the identity or location of publishing clients.

Publish-subscribe middleware messaging systems also may operate on input message streams in either a so-called "stateless" or "stateful" manner. A "stateless" (also called topic-based or content-based) publish-subscribe system is one in which (1) delivered messages are a possibly filtered subset of published input messages, and (2) a subscription criterion selected by a message service provider is a property that can be tested on each message independent of any other, such as "topic=stock-ticker" or "volume>10000 & issue=IBM".

A "stateful" publish-subscribe system is one where subscriptions are "stateful"; that is, the publish-subscribe system creates output messages containing information derived from multiple messages culled from one or more message streams, e.g. "Give me the highest quote of IBM within each one-minute period." This, furthermore, generally entails delivering information other than simply a copy of published messages, for example, "Tell me how many stocks fell during each one-minute period."

In both the stateless and stateful cases, publish-subscribe middleware messaging systems are implemented as overlay networks, that is, a collection of broker machines that accept messages from publishing clients, deliver subscribed information to subscribing clients and route information between publishing clients and subscribing clients.

Once a publish-subscribe middleware messaging system starts computing transforms, the placement of the software modules performing these computations becomes central to the performance of the messaging system. At a high level this problem is similar to many earlier task assignment problems in parallel and distributed systems. However, the transform tasks that do stream processing of database operators have unique properties. These tasks are always available and therefore always running, and their resource utilization is a function of incoming message rates generated by publishing clients. The data flows from specific sources (publishing clients) to specific sinks (subscribing clients), fixing some tasks to specific processors. Furthermore, a common objective typically applied in such situations—load balancing the system for better resource utilization—is not as important. Typically client subscription update latency and throughput are more important system performance metrics and their improvement or optimizations are often the key objectives.

Accordingly, in publish-subscribe middleware messaging systems implemented through overlay networks comprising a plurality of broker machines, those skilled in the art desire methods and apparatus for efficiently distributing information transforms among broker machines comprising the overlay network.

In addition, those skilled in the art desire a selection of one or more performance metrics that would be improved or optimized through efficient placement of information transforms among the broker machines comprising the overlay network. Those skilled in the art particularly desire methods and apparatus for placing information transforms among broker machines comprising the overlay network so that latency and throughput of messaging activities performed by the broker machines comprising the overlay network is improved.

SUMMARY OF THE PREFERRED EMBODIMENTS

A first alternate embodiment of the present invention comprises a signal-bearing medium tangibly embodying a program of machine-readable instructions executable by a digital processing apparatus of a computer system to perform operations controlling a publish-subscribe messaging system, where the publish-subscribe messaging system comprises publishing clients, subscribing clients, and a plurality of broker machines, the plurality of broker machines comprising an overlay network that accepts input message streams from publishing clients, transforms input message streams into output message streams according to pre-determined message transformation criteria, where the criteria are contained in message transforms implemented as software modules, the software modules being distributed among the broker machines, and the overlay network then delivering the output message streams to the subscribing clients, the operations comprising: selecting at least one performance parameter corresponding to a performance measure of the publish-subscribe messaging system; monitoring a level of resource utilization of the overlay network; making a provisional assignment of message transforms among the broker machines of the overlay network; performing calculations to determine a value of the at least one performance parameter of the publish-subscribe messaging system in accordance with the provisional assignment of message transforms and the level of resource utilization of the overlay network; and deciding if the provisional assignment of the message transforms among the broker machines results in an acceptable value of the at least one performance parameter and, if it does, assigning the message transforms among the broker machines in accordance with the provisional assignment.

A second alternate embodiment of the present invention comprises a system for managing operations of an overlay network comprising a plurality of broker machines in a publish-subscribe messaging system, where the publish-subscribe messaging system comprises publishing clients, subscribing clients, and the plurality of broker machines, the plurality of broker machines comprising the overlay network that accepts input message streams from publishing clients, transforms input message streams into output message streams according to pre-determined message transformation criteria, where the criteria are contained in message transforms implemented as software modules, the software modules being distributed among the broker machines, and then delivers the output message streams to the subscribing clients, the system comprising: at least one memory to store at least one program of machine-readable instructions, where the at least one program performs operations to distribute the message transforms among the broker machines; a plurality of sensors to measure a level of resource utilization of the overlay network; and at least one processor coupled to the at least one memory, plurality of sensors and overlay network, where the at least one processor performs at least the following operations when executed: selecting at least one performance parameter corresponding to a performance measure of the publish-subscribe messaging system; monitoring the level of resource utilization of the overlay network; making a provisional assignment of message transforms among the broker machines; performing calculations to determine a value of the at least one performance parameter of the publish-subscribe messaging system in accordance with the provisional assignment of message transforms and the level of resource utilization of the overlay network; and deciding if the provisional assignment of the message transforms among the broker machines results in an acceptable value of the at least one performance parameter and, if it does, assigning the message transforms among the broker machines in accordance with the provisional assignment.

A third alternate embodiment of the present invention comprises a processor-implemented method for use in a publish-subscribe messaging system, where the publish-subscribe messaging system comprises publishing clients, subscribing clients, and a plurality of broker machines, the plurality of broker machines comprising an overlay network that accepts input message streams from publishing clients, transforms input message streams into output message streams according to pre-determined message transformation criteria, where the criteria are contained in message transforms implemented as software modules, the software modules being distributed among the broker machines, and then delivers the output message streams to the subscribing clients, the method comprising: selecting at least one performance parameter corresponding to a performance measure of the publish-subscribe messaging system; monitoring a level of resource utilization of the overlay network; making a provisional assignment of message transforms among the broker machines; performing calculations to determine a value of the at least one performance parameter of the publish-subscribe messaging system in accordance with the provisional assignment of message transforms and the level of resource utilization of the overlay network; and deciding if the provisional assignment of the message transforms among the broker machines results in an acceptable value of the at least one performance parameter and, if it does, assigning the message transforms among the broker machines in accordance with the provisional assignment.

The invention is a service of a stateful publish/subscribe system that continuously determines an ideal place to carry out stream computations—the placement of transforms within the overlay network of brokers. In the methods and apparatus of the present invention, published message sequences are transformed via various functions before reaching subscribers; and the transform process is implemented by propagating messages through the overlay network using a sequence-processing graph built out of individual message transforms. The invention described herein helps to assign the transforms to broker machines that carry out the computation.

As used in this disclosure, the term message transform denotes a software module or component, e.g., a Java object instance, which takes as input one or more sequences of messages, and produces as output one or more sequences of messages. In typical use, a message transform keeps some local state, and is repeatedly triggered upon receipt of a new message on one of its inputs; it then performs some computations whose effect is to possibly modify its state and to possibly generate one or more new messages on one or more of its output sequences. By way of example, the input messages of a transform might represent published events such as stock trades, and the output messages of the transform might represent changes to a table of total stock value per day grouped by stock issue; the function of the transform is to compute the change to the total in the appropriate row based upon the current state, whenever a new published event arrives. A dataflow hypergraph consists of a multiplicity of such message transforms connected together into a flow graph, such that the output sequence produced by one message transform is fed to the instance of another transform. On a distributed network it is possible for some of the transforms in the sequence processing graph to be deployed on different machines (e.g., communicating over asynchronous links). In the system of the present invention, subscribers are interested in the results of one or more functions computed over one or more published sequences (subscriptions); the system usually computes and propagates many message sequences concurrently.

To compute and deliver message sequences to subscribers efficiently the transforms involved in the computation need to be placed on the nodes of the broker network intelligently in order to maximize some measure of performance. In the system of the present invention this placement of transforms is done continuously in response to system state changes, resource availability and client demands. The system monitors itself using a set of agents who submit performance feedback to the Performance Optimization Service that uses the data to issue new transform deployment instructions.

Thus it is seen that embodiments of the present invention overcome the limitations of the prior art. In the prior art there was no known way for assessing or improving the efficiency of messaging activities performed by broker machines comprising an overlay network in a publish-subscribe middleware messaging system. In such systems, publishing clients submit input message streams to the overlay network. The broker machines of the overlay network execute transformations on the input message streams according to specifications created by message service providers, and the transformed message streams are then delivered to the subscribing clients.

In contrast to the prior art, embodiments of the present invention provide methods and apparatus capable of efficiently placing software modules implementing message transforms among the broker machines comprising the overlay network. In particular, embodiments of the present invention both select performance metrics for gauging messaging activities performed by broker machines and provide methods and apparatus for improving or optimizing the selected metrics.

In particular, the methods and apparatus of the present invention improve the latency and throughput of stateful messaging activities performed by broker machines comprising an overlay network in a publish-subscribe middleware messaging system.

In conclusion, the foregoing summary of the alternate embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

In the present invention, there is a plurality of broker machines responsible for delivery of messages sent by publishing clients towards subscribing client based upon the content of these messages and transformations specified by messaging services and subscribed to by the subscribing clients. The broker machines form an overlay network. The description of the network is similar to the description in co-pending U.S. patent application Ser. No. 10/177,474 entitled "A Method of Guaranteed Delivery of Messages in a Highly Scalable Publish/Subscribe System", assigned to the same assignee as the present application, and which is hereby incorporated by reference in its entirety as if fully restated herein.

Some broker machines may be specialized for hosting publishing clients—these will be referred to as publisher-hosting brokers (hereinafter "PHBs"), others for hosting subscribing clients—these will be referred to as subscriber-hosting brokers (hereinafter "SHBs"). Between the PHBs and SHBs there may be any number of intermediate hops that include routing and filtering—the brokers at such hops will be referred to as intermediate brokers (hereinafter "IBs"). For expository purposes, it will be assumed that the functionality of PHBs, SHBs and IBs are implemented in separate machines, but in actual deployment it may be that all machines combine these functions.

Figure 1:
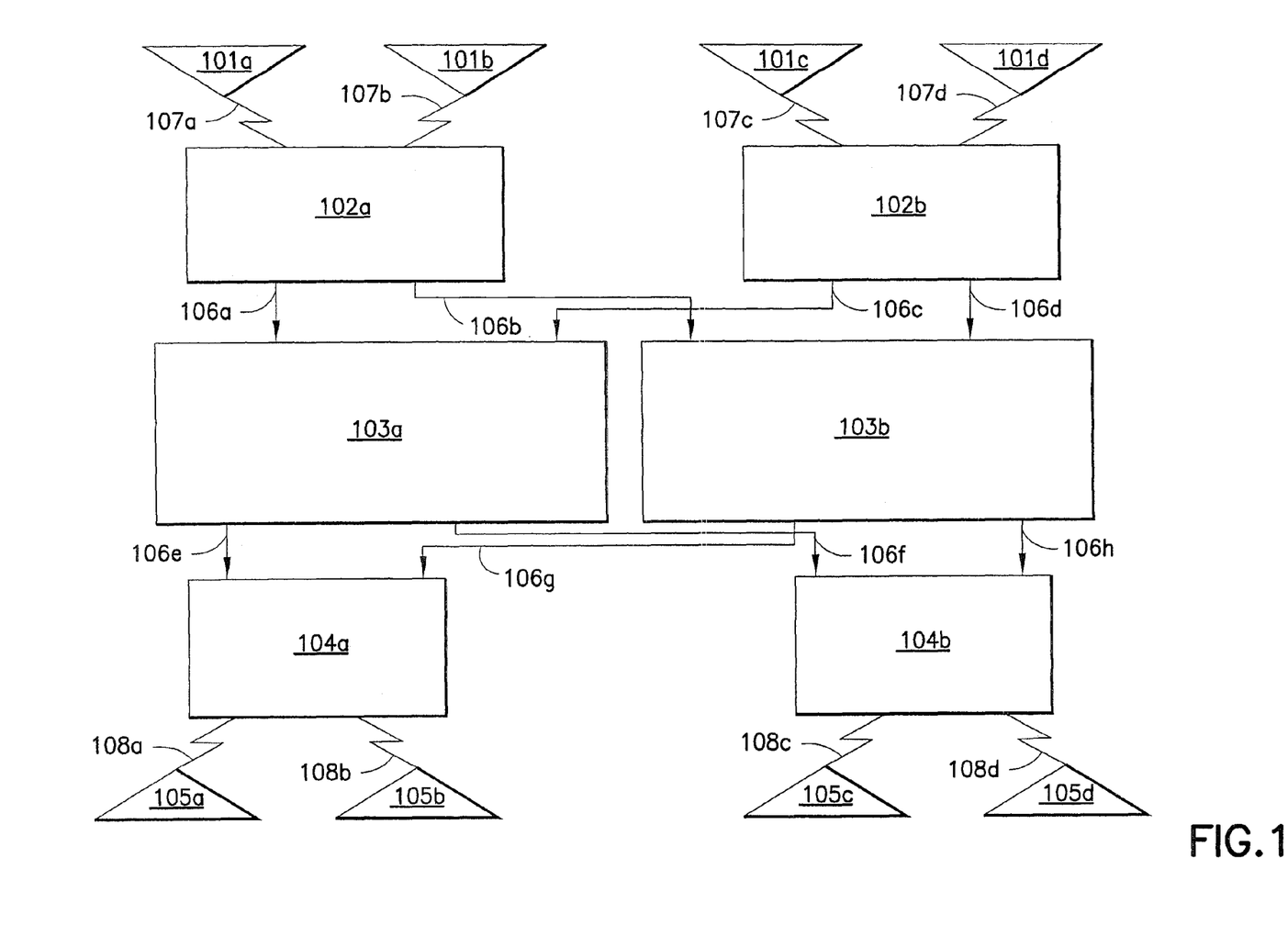
FIG. 1 depicts a broker network which hosts the publish-subscribe system of the resent invention, illustrating publishers, subscribers, brokers and links.

FIG. 1 illustrates part of a typical network of brokers used in the present invention. A publishing client such as 101a establishes a connection to a PHB 102a over a client connection 107a. The client connection can be any reliable FIFO connection such as a TCP/IP socket connection. Independently, a subscribing client such as 105a establishes a connection to a SHB 104a over a similar FIFO client connection 108a. The PHBs and SHBs are connected through broker-to-broker links 106 and intermediate brokers 103. Since a fault-tolerant protocol tolerates link failures and message reorderings, it is not necessary for the broker-to-broker connections to use reliable FIFO protocols such as TCP/IP, but may advantageously use faster, less reliable protocols. Each broker machine can be either a standalone computer, a process within a computer, or (to minimize delay due to failures) a cluster of redundant processes within multiple computers. Similarly, the links may be simple socket connections, or connection bundles that use multiple alternative paths for high availability and load balancing.

Figure 2:
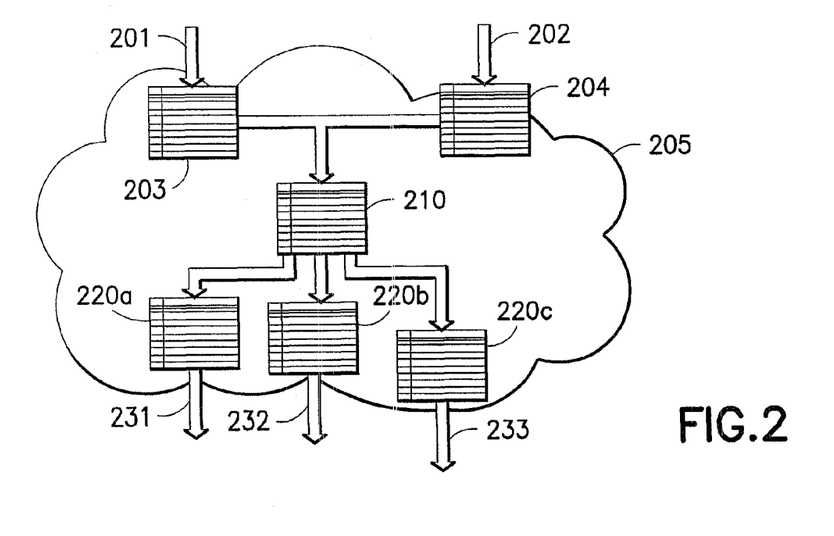
FIG. 2 depicts a service provided by the system as seen by publishers and subscribers in the preferred embodiment, illustrating base relations, derived and subscribed views, and subscription.

FIG. 2 illustrates how the stateful publish-subscribe service of the present invention appears to clients. Clients are unaware of the physical broker network or its topology; a client application may connect to any broker in the role of publisher and/or subscriber. Publishing clients, such as 201 and 202, are aware only of particular named streams. Multiple clients may publish to the same stream. In FIG. 2, client 201 is publishing events to stream 203, and client 202 is publishing events to stream 204. Administrators and clients may define derived views based on functions of either published streams or other derived views. In an embodiment of the present invention, published streams are represented as relations, and derived views based on functions of either published streams or from other derived views by means of relational algebraic expressions in a language such as Date and Darwen's Tutorial-D or SQL or XQUERY. For example, view 210 is defined as a function of stream relations 203 and 204 by means of a join expression with relations 203 and 204 as inputs add relation 210 as output. Such a specification deriving relation 210 from relations 203 and 204 is indicated in the figure by the hyperedge 205 (two-tailed arrow leading from 203 and 204 to 210). Similarly, relations 220a, 220b and 220c are derived from relation 210 by client-specified relational expressions—for example, 220c could be a request to group the stock trades of relation 210 by issue and hour, and compute the running total volume, and max and min price for each issue-hour pair. Each client subscribes to a particular derived view; in this figure clients 231, 232 and 233 are subscribers, subscribing respectively to views 220a, 220b and 220c which they have specified by relational expressions. As published events enter the system from publishing clients 201 and 202, they are saved in their respective streams 203 and 204. The system is then responsible for updating each derived view according to the previously specified relational expressions, and then delivering to each subscriber client messages representing the changes to the state of his subscribed view.

The above description describes the service specification of the system as it appears to clients. The companion U.S. patent application Ser. No. 10/177,474 entitled "A Method of Guaranteed Delivery of Messages in a Highly Scalable Publish/Subscribe System" describes a preferred embodiment for implementing this specification on a fault-free broker network.

Figure 3:
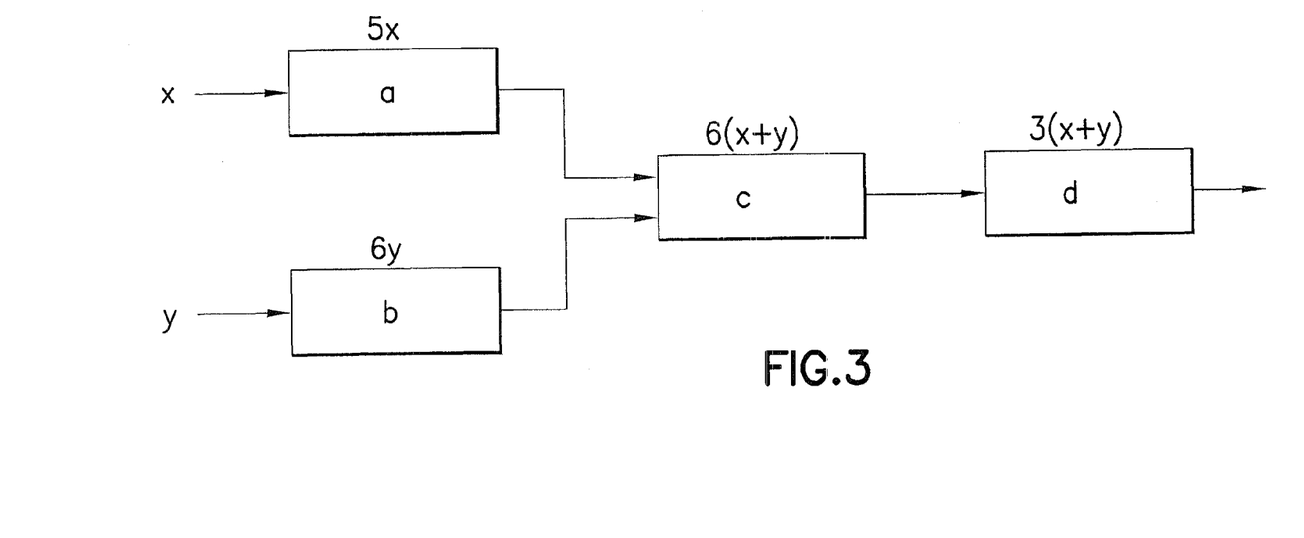
FIG. 3 depicts an exemplary subscription as a directed acyclic graph suitable for practicing the methods and apparatus of the present invention.
Figure 4:
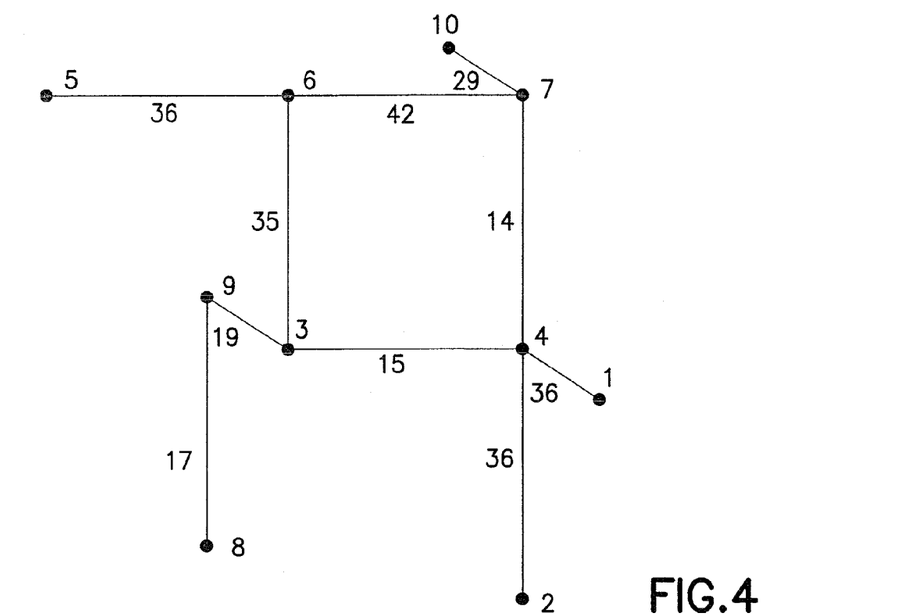
FIG. 4 depicts ten-node broker topology suitable for practicing the methods and apparatus of the present invention.

To make things concrete, consider the placement problem for a single 4-task subscription on a 10-node broker topology shown in FIGS. 3 and 4. Assume that there are two publishers: one generating stock events with schema (name, price) and another generating current investment portfolio events with schema (name, volume). A subscription "portfolio value" enables a subscribing client to continuously observe the value of the portfolio based on the latest ticker prices. The subscription is given as follows:

CREATE Subscription "Portfolio Value"=SELECT
   SUM (stock.price*portfolio.volume) FROM
   (stock JOIN portfolio on stock.name) WHERE
   (stock.timestamp is LATEST)

It can be represented by a task graph (FIG. 3) with vertices $V=\{a, b, c, d\}$, where the vertices are relational operators and edges represent data flow. In this graph node $a$ is a task that computes projection on stock, $b$ computes projection on portfolio, $c$ computes the join and task $d$ computes the sum operator.

The graph in FIG. 4 represents a broker topology, where nodes are processors and edges are direct connections with latencies in milliseconds. Assume further that publisher \textbf{stock} is attached to node 5 and publisher \textbf{portfolio} is at node 3. If two clients (say at nodes 2 and 10) subscribe to "Portfolio Value", then the placement problem is where to compute the relational operators to offer best performance to the two clients. Namely, an assignment of tasks $a, b, c$ and $d$ to brokers $1 \ldots 10$ that maximizes a latency-throughput objective function.

One possible assignment for the example is $$\{a \to 5, b \to 3, c \to 4, d \to 4\} \quad (1)$$

It has a minimum latency of the walk $(5, 6, 3, 4, 2)$ for the first subscriber and the walk $(5, 6, 3, 4, 7, 10)$ for the second. The maximum throughput (in messages/second) this assignment can sustain is:

$$\min \frac{\hat{4}}{\text{stress}(c, d)}, \frac{\hat{5}}{\text{stress}(a)}, \frac{\hat{3}}{\text{stress}(b)}, \quad (2)$$

where the hats on broker numbers represent broker computing capacities (in cycles/second) and the stress function determines the task cycle needs (in cycles/message). The stress functions for tasks are shown in FIG. 3 as:

$$\text{stress}(c,d) \equiv 6(x+y)+3(x+y) \quad (3)$$

In a preferred embodiment, such as the one described in co-pending U.S. patent application Ser. No. 10/841,916 entitled "A Distributed Messaging System Supporting Stateful Subscriptions", assigned to the same assignee as the present application and hereby incorporated by reference in it entirety, subscription specifications are analyzed by a compiler, and converted into a collection of transform objects and view objects. Each operator that derives a view from one or more inputs corresponds to a transform object; each view corresponds to a view object. View objects hold the state of a view; transform objects express the logic for incrementally updating an output view constituting the result of an operator in response to individual changes to input views constituting the arguments to that operator. For example, in FIG. 5, views 310 and 320 are view objects that are inputs to some operator. Transform 350 is a transform object for that JOIN operator, which produces a derived view shown as view object 370. When one of the input objects changes (either because it is itself a published input stream, or because it is a derived view that has changed as a result of changes to its inputs), messages reflecting these changes are sent to transform object 350 over the pathway 330. Transform 350 (a) receives messages representing changes to its inputs 310 or 320, and then (b) computes how the result of the operator changes given the announced changes it has received, and then (c) delivers the computed result to its output view object 370 over the pathway 360 in the form of change messages. The output view object 370 then propagates in its turn such change messages, either to further transforms if view object 370 is an intermediate view, or to subscribers if view object 370 is a subscribed view.

Figure 5:
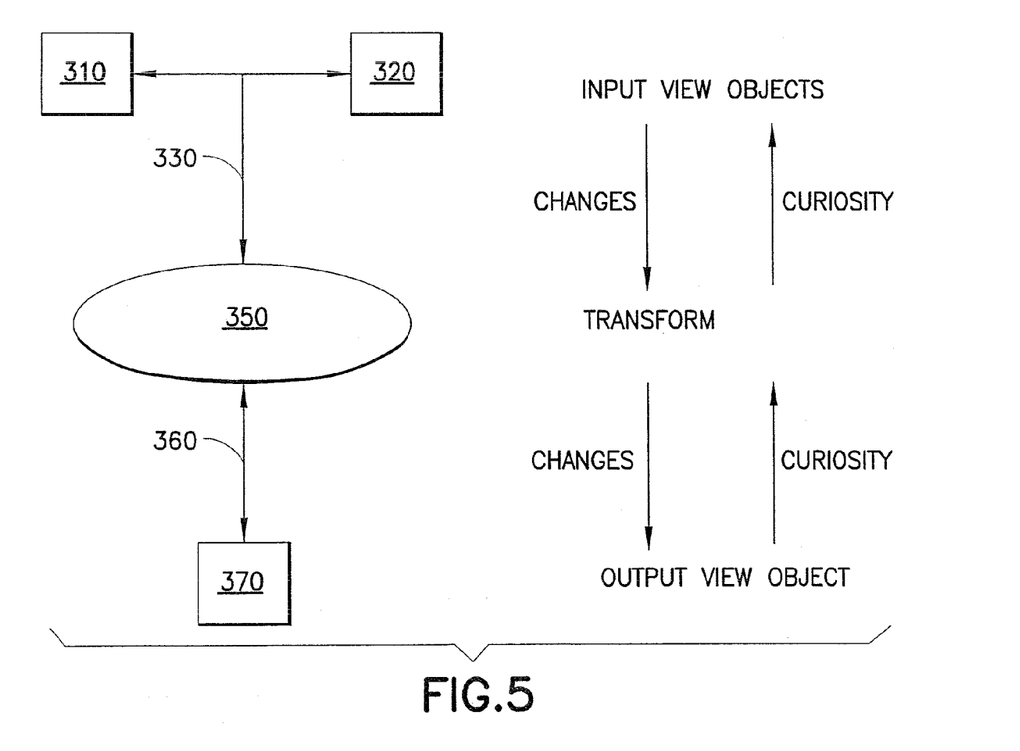
FIG. 5 depicts a segment of a dataflow hypergraph, showing two input view objects connected via a hyperedge to a single output view object by means of a relation object, and illustrates the direction of flow of messages representing state changes and messages representing curiosity.
Figure 6:
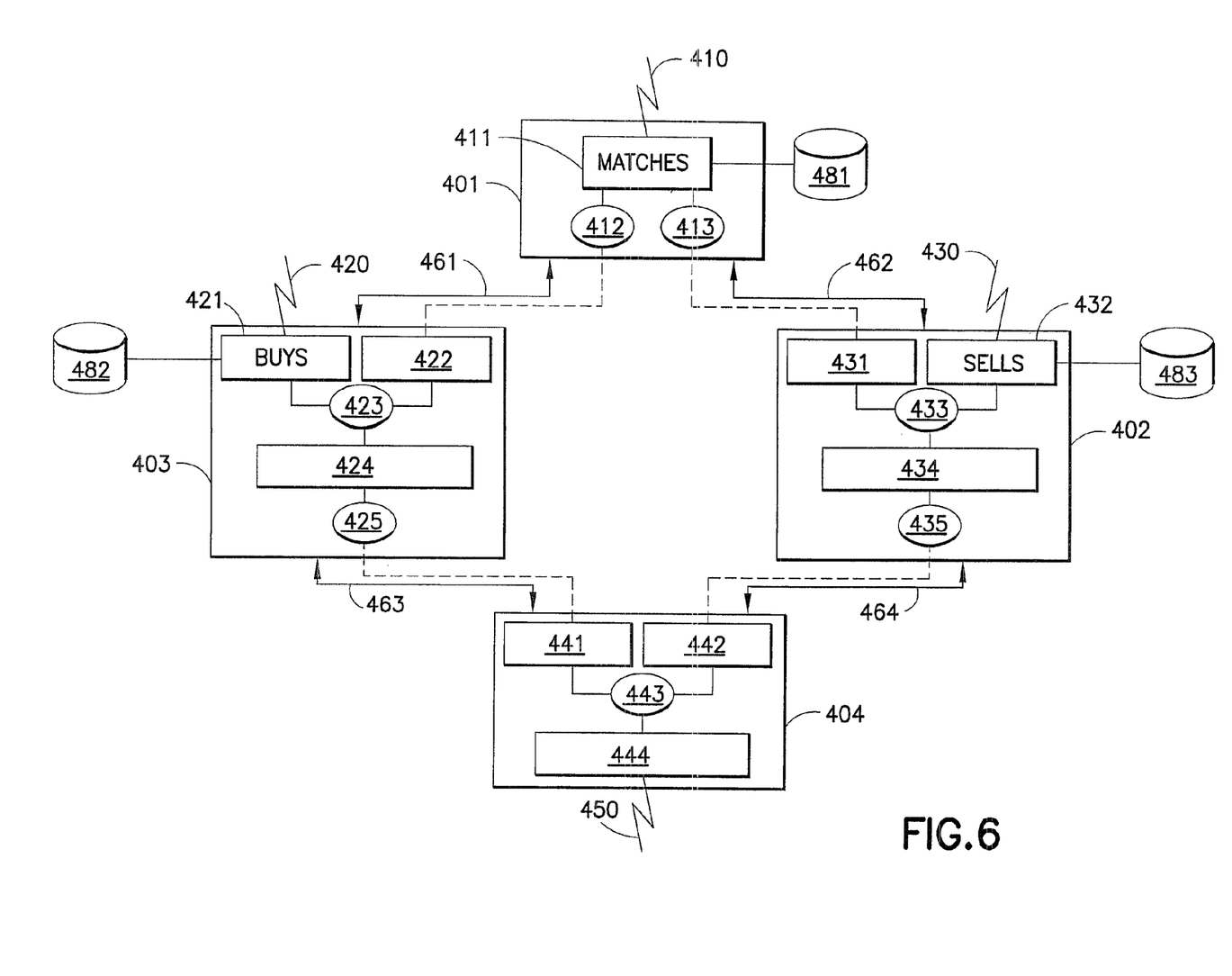
FIG. 6 depicts an entire dataflow hypergraph, distributed over multiple brokers, in which flows between some objects are internal to a broker, while other flows pass over physical links.

FIG. 5 illustrated the object and message pathways for a single transform implementing a single computational operation. When subscriptions are entered, the apparatus of our invention builds a structure containing all the transform objects and view objects needed for all intermediate and subscribed views of all subscriptions. This structure is called a dataflow hypergraph. The dataflow hypergraph has nodes corresponding to each view object, and hyperedges (edges with possibly more than one input feeding an output) representing each transform object associated with an operation in the subscription specification. The view objects and transform objects are then allocated to actual brokers in the overlay network. The published streams and the subscribed views are constrained to be located on brokers where the publishers and subscribers actually connect. The placement of the intermediate transform objects and view objects is not constrained; they can be placed wherever suitable, taking into consideration the capacities of the brokers and links and considerations of performance. After such allocation of objects to brokers, the result is a distributed transform graph, an example of which is shown in FIG. 6. In FIG. 6, the physical network consists of brokers 401, 402, 403 and 404, connected by links 461, 462, 463 and 464. There are three publishing clients: 410, 420 and 430, and one subscribing client 450. The publishing clients are publishing to three separate published message streams: buys 421, on broker 403, sells 431 on broker 402 and matches 411 on broker 401. The subscribing client is subscribing to derived view 444 on broker 404. As can be seen in FIG. 6, the transform graph consists of multiple transform and view objects distributed over all brokers. The paths between objects will sometimes lie within a broker, as is the case between transform object 423 and intermediate view object 424. In other cases, such as the path between transform 425 and intermediate view object 441 (shown with a dotted line), the path crosses between brokers, necessitating that the messages traversing the path must cross over a link, in this case link 463. It is clear to those versed in the art that the within-broker communications between objects can use cheaper communication (parameter passing), whereas the cross-broker communications requires generating physical messages or packets that will cross the link. In the preferred embodiment, the protocols of all view objects and transform objects will be able to recover from lost, out-of-order and duplicate messages, and therefore they will work correctly regardless of which paths between objects cross broker boundaries and which do not.

In the discussion to follow, "downstream" will refer to the direction along the hypergraph from input streams towards subscribers; "upstream" will refer to the opposite direction from a subscribed or intermediate view object back towards the input streams or intermediate views used to compute them.

Formally, a publish-subscribe middleware messaging system consists of a processor topology, subscriptions, publishers and subscribers. A subscription is logically equivalent to a view definition, given as a directed acyclic graph (DAG) of the operators implementing the derivation. These operators are called tasks and for subscription i $\Gamma_i(T_i, E_i)$ is a subscription graph where $T_i$ is a set of tasks and $E_i$ a set of edges representing paths between tasks.

The set $T = \cup_i T_i$ is the set of all tasks which is further augmented with special tasks or publishers and subscribers. Messages flow from publishers $P \subset T$, towards subscribers $S \subset T$, and get transformed by the intermediate tasks qj I $\subset T \triangleq (T-P)-S$. For the purposes of the model and without a loss of generality $P \cap T = \emptyset$.

Since an intermediate task $t \in I$ can receive messages derived from more than one publisher, let $F(t)$ be the set of publishers supplying t with data—the feed set for t. A publisher $p \in P$ is in $F(t)$ if there is a path from p to t in some subscription graph $\Gamma_j$.

Let $R = \{r_1, r_2, \ldots, r_n\}$ be the set of n heterogeneous (different computational capability) processors that can each host one or more flow transform tasks. Processor capability can be described as a capacity measure in terms of the maximum instructions per second at 100% CPU saturation. The capacity of processor $r \in R$ is represented by $\hat{r}$.

It is assumed processors are networked (e.g., Ethernet) and can communicate with one another. While logically a processor can send a message to any other, it typically does not have a direct connection to every processor and has to go through one or more "hop" processors that function as message routers. Thus, the processor network is viewed as a topology. Matrix 1 of size n×n represents communication latency between any two processors. l is an input to the problem and is usually determined empirically. When tasks that communicate are assigned to different processors (say $p_1$ and $p_2$) the communication delay between these tasks is $l(p_1, p_2)$. Tasks on the same processor have a delay of 0.

An assignment of tasks to processors is given as follows:

Definition (Assignment): An assignment $\pi(t,r):T \times R \rightarrow Bool \triangleq 1$ if task $t \in T$ is assigned to processor $r \in R$; 0 otherwise.

Two auxiliary functions are also used: a) $\pi(t):T \rightarrow R$ which maps task t to the processor where it is assigned and b) $\pi(r):R \rightarrow 2^T$ which gives the set of tasks assigned to r.

Furthermore, an assignment is complete if all tasks have been assigned.

With each publisher task $p \in P$ a constant $k_p \in \mathbb{N}^+$ and a variable $x_p \in \mathbb{N}^+$ is associated. The vector $K = [k_1, k_2, \ldots, k_n]$ is a problem input and it determines how the maximum publication rate (in messages/second) should be computed for each publisher. The vector $X = [x_1, x_2, \ldots, x_n]$ is an output of the problem and contains the actual maximum publication rates for publishers.

Definition (Solution): A solution to the Placement Problem is a triple $(\pi, \theta, \lambda)$ where $\pi$ is an assignment of tasks to brokers, $\theta$ is the base throughput of the system and $\lambda$ is the worst subscription latency. The base throughput $\theta$ allows publishers to compute their maximum allowed publication rates.

Now, the quality of the assignment is evaluated using a throughput-latency objective function. To perform the evaluation (regardless of what this function looks like) it is necessary to determine a way to compute the throughput and the latency due to the assignment.

If it is assumed that tasks use processor cycles as a linear function of the message rates they process, then a vector $\Lambda(t)$ can be defined to represent the utilization sensitivity of task t to its feed publication rates. $\Lambda(t)$ is a positive real vector of size |P| enumerated to match publishers in P. It contains empirically-determined sensitivity values to each publisher's rate (the value is 0 for publishers not in the feed of t). The j'th element of $\Lambda(t)$ is in cycles/message and represents how the usage (in additional cycles) of task t will impact the processor where it is assigned when j'th publication rate increases by a single message/second. Naturally, the publishers not in the feed set of t cannot possibly affect t's usage of its processor.

Now a way is needed to reason about the system throughput as a function of the publication rates. However, there are P publishers and if publisher rates are treated as independent, then the throughput performance would have to be treated as a vector of size |P|, being a solution to the system of inequalities:

$$\forall_{r \in R} \sum_{t \in \pi(r)} \Lambda(t) X \leq \hat{r} \quad (4)$$

Instead throughput is defined as a scalar with units in messages/second, because that is what would make most sense to users when they think of system performance. To make throughput more intuitive, yet preserving the sensitivity of tasks to publisher rates, the following assumptions are proposed:

Definition (Base Rate Assumption): Suppose the publication rates from all the publishers could be expressed as linear functions of a single rate $\bar{x}$, called the base rate. That is $$X = \bar{x} K \quad (5)$$

where K is a scaling vector specified as problem input.

The processor utilization due to task t can now be expressed as a stress function $Y(t):T \rightarrow \mathbb{N}^+ = \Lambda(t)X$ (in cycles/second) which can be thought of as a processor load arising from running task t. For example, consider task r with feed set $F(\tau) = \{1,3,4\}$ and $\Lambda(r) = [2,0,5,1]$. Then it takes a processor $Y(\tau) = 2x_1 + 5x_3 + x_4$ cycles/second to execute task $\tau$ (the actual amount of cycles would depend on the publication rates from publishers 1, 3 and 4).

Definition (Processor Throughput): Let set $A \cup T$ of tasks be assigned to processor $r \in R$. Then the total processor r utilization due to A is $U_r(A) = \Sigma_{t \in A} Y(t)$. Then processor base rate for load A is:

$$\theta_r(A) \triangleq \max \bar{x} \left| \sum_{t \in A} \Upsilon(t) \leq \hat{r} \right. \quad (6)$$

where $\theta_r$ is in messages/second. Namely, $\theta_r$ is the highest base rate that satisfies the processor capacity constraint, due to all the tasks in set A.

Now, the base rate assumption does have an intuitive meaning: it provides a way to compare the stress different publishers put on processors. It also provides an effective mechanism to express priorities among publishers. When problem specification has $x_1 = \bar{x}$ and $x_2 = 2\bar{x}$, it requires an optimal solution to allow the second publisher twice as much resource bandwidth as the first.

Furthermore, in practice it should not be too restrictive, since a solution for X designates only the ceiling (maximum sustainable publication rate) for each publisher, not the rate at which it must publish.

Now a maximum throughput due to a complete assignment can be defined:

Definition (Assignment Throughput): Let $\pi$ be an assignment of tasks to brokers. The maximum throughput due to $\pi$ is then:

$$\theta(\pi) \triangleq \min_{r \in R} \theta_r(\pi(r)) \quad (7)$$

This definition gives a scalar throughput value (in messages/second) that represents all throughput on all processors and also has a useful meaning: the throughput of an assignment is equal to the throughput of the (slowest) bottleneck processor.

The latency of an assignment is the latency of the path in the topology graph between a publisher p and a subscribers who are farthest apart as a result of the placement of the intermediate tasks.

Definition (Assignment Latency). Let $\Gamma^M$ be the incidence matrix form of $\cup_{s \in S} \Gamma_s$ (the union of the subscription graphs). Then:

$$\lambda(\pi) \triangleq \max_{p \in P, s \in S} \sum_{(i,j) \in path(p,s)} \Gamma^M(i,j) \cdot l(\pi(i), \pi(j)) \quad (8)$$

where path (p, s) is a sequence of edges (given as vertex pairs) along the path in a subscription graph from publisher p to subscriber s.

For example, to compute the latency of the assignment 1 ($\pi = \{a \to 5, b \to 3, c \to 4, d \to 4\}$) for the problem in FIG. 3 with two publishers $\pi(p_1)=5$, $\pi(p_2)=3$ and two subscribers $\pi(s_1)=10$, $\pi(s_2)=2$ the paths of all publisher-subscriber pairs need to be evaluated:

| Pair | Path |
| --- | --- |
| $\{p_1, s_1\}$ | $\pi(p_1), \pi(a), \pi(c), \pi(d), \pi(s_1) \to \{5, 5, 4, 4, 10\}$ |
| $\{p_2, s_1\}$ | $\pi(p_2), \pi(b), \pi(c), \pi(d), \pi(s_1) \to \{3, 3, 4, 4, 10\}$ |
| $\{p_1, s_2\}$ | $\pi(p_1), \pi(a), \pi(c), \pi(d), \pi(s_2) \to \{5, 5, 4, 4, 2\}$ |
| $\{p_2, s_2\}$ | $\pi(p_2), \pi(b), \pi(c), \pi(d), \pi(s_2) \to \{3, 3, 4, 4, 2\}$ |

Figure 7:
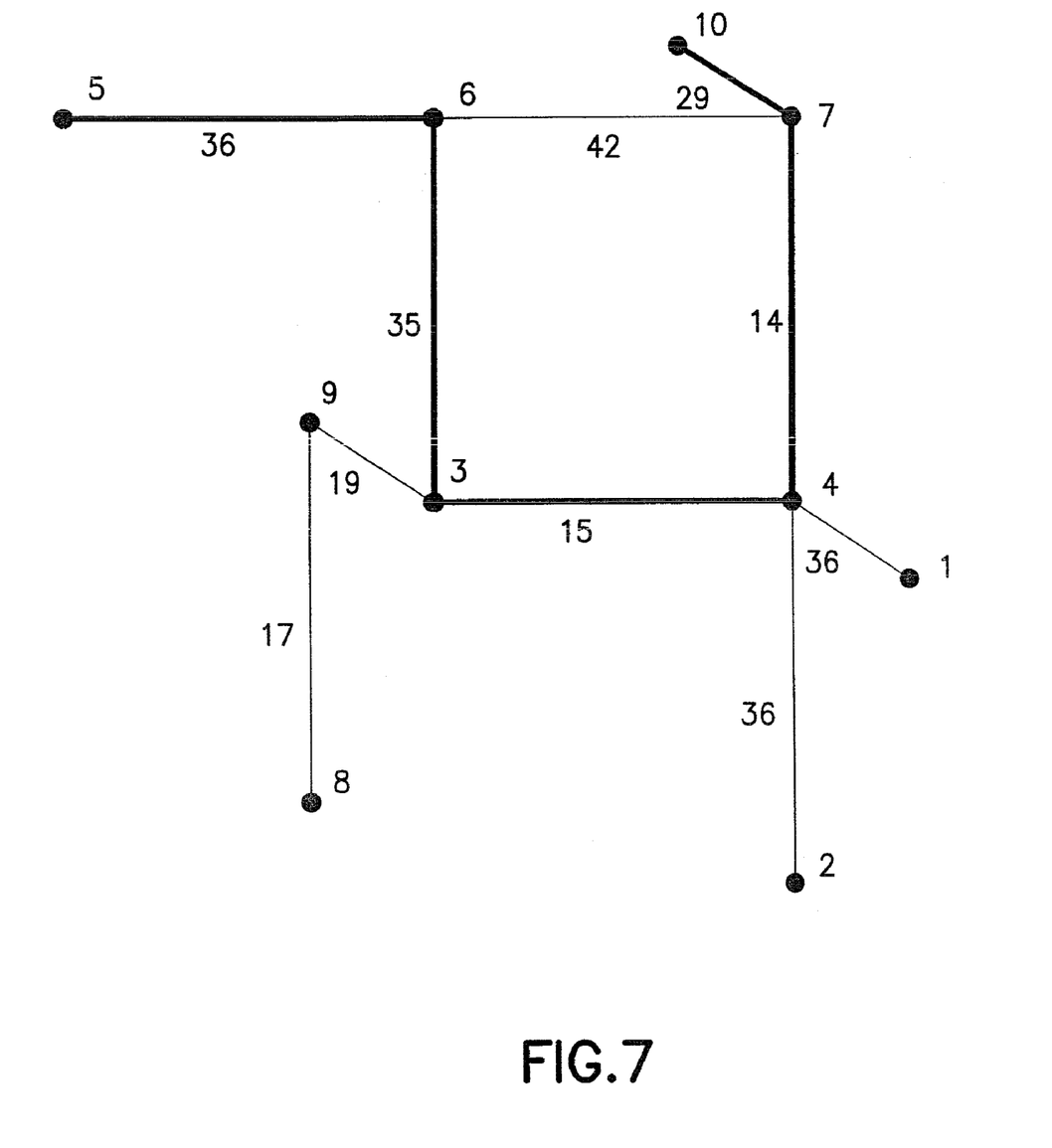
FIG. 7 depicts a visualization of the latency path for $\{p_1, s_1\}$.

FIG. 7 is a visualization of the path for the pair $\{p_1, s_1\}$.

The objective of the present invention is to assign tasks to processors such that subscriber throughput is maximized and subscription latency (total latency from publication source to subscriber) is minimized subject to the capacitance constraints of links and processors.

For convenience the following symbol table is provided:

| Symbol | Meaning |
| --- | --- |
| $\Gamma_i$ | a task DAG for all subscription i |
| T | set of all tasks |
| R | set of all processors |
| $\hat{r}$ | capacity of processor $r \in R$ |
| F(t) | the feed set for task t |
| X | input variables for publisher rates |
| $l(r_i, r_j)$ | shortest distance between processors $r_i$, $r_j$ |
| $\Lambda(t)$ | task t sensitivity to publisher rates |
| $\gamma(t)$ | processor load due to task t |
| $\pi$ | an assignment of tasks to brokers |
| $\pi(t_i, r_j)$ | 1 when task $t_i$ is assigned to processor $r_j$ in $\pi$; 0 otherwise |
| $\theta(\pi)$ | throughput due to assignment $\pi$ |
| $\lambda(\pi)$ | Latency due to assignment $\pi$ |
| $\phi(\lambda(\pi), \theta(\pi))$ | Objective function |

The placement optimization problem is given by:

maximize:

$$\phi(\lambda(\pi), \theta(\pi)) \quad (9)$$

subject to:

$$\forall_{t \in T} \sum_{r \in R} \pi(t, r) = 1 \quad (10)$$

$$\forall_{r \in R} \sum_{t \in \pi(r)} \Lambda(t) \cdot \theta_r(\pi(r)) \cdot K \leq \hat{r} \quad (11)$$

$$\forall_{t \in T} \forall_{r \in R} \pi(t, r) = 0 | 1 \quad (12)$$

where 9 is a throughput-latency objective function, the constraint 11 ensures that all solutions stay within processor capacities, 10 ensures that each task is assigned to exactly one processor, and 12 is for structural consistency. Note that $\phi$ is implicitly a function of X through the definition of $\theta$.

To make the problem practical, a specification of the objective function is needed that would actually correspond to the trade-offs in latency and throughputs that clients would want to make.

Definition (Refined objective function): For an objective function, the following definition is proposed:

$$\phi(\lambda(\pi), \theta(\pi)) \triangleq \underbrace{-e^{c_1 \lambda(\pi)} \cdot c_2}_{\text{latency}} + \underbrace{(1 - e^{c_3 \theta(\pi)}) \cdot c_4}_{\text{throughput}} \quad (13)$$

where $c_1, \ldots c_4$ are constants.

Figure 8:
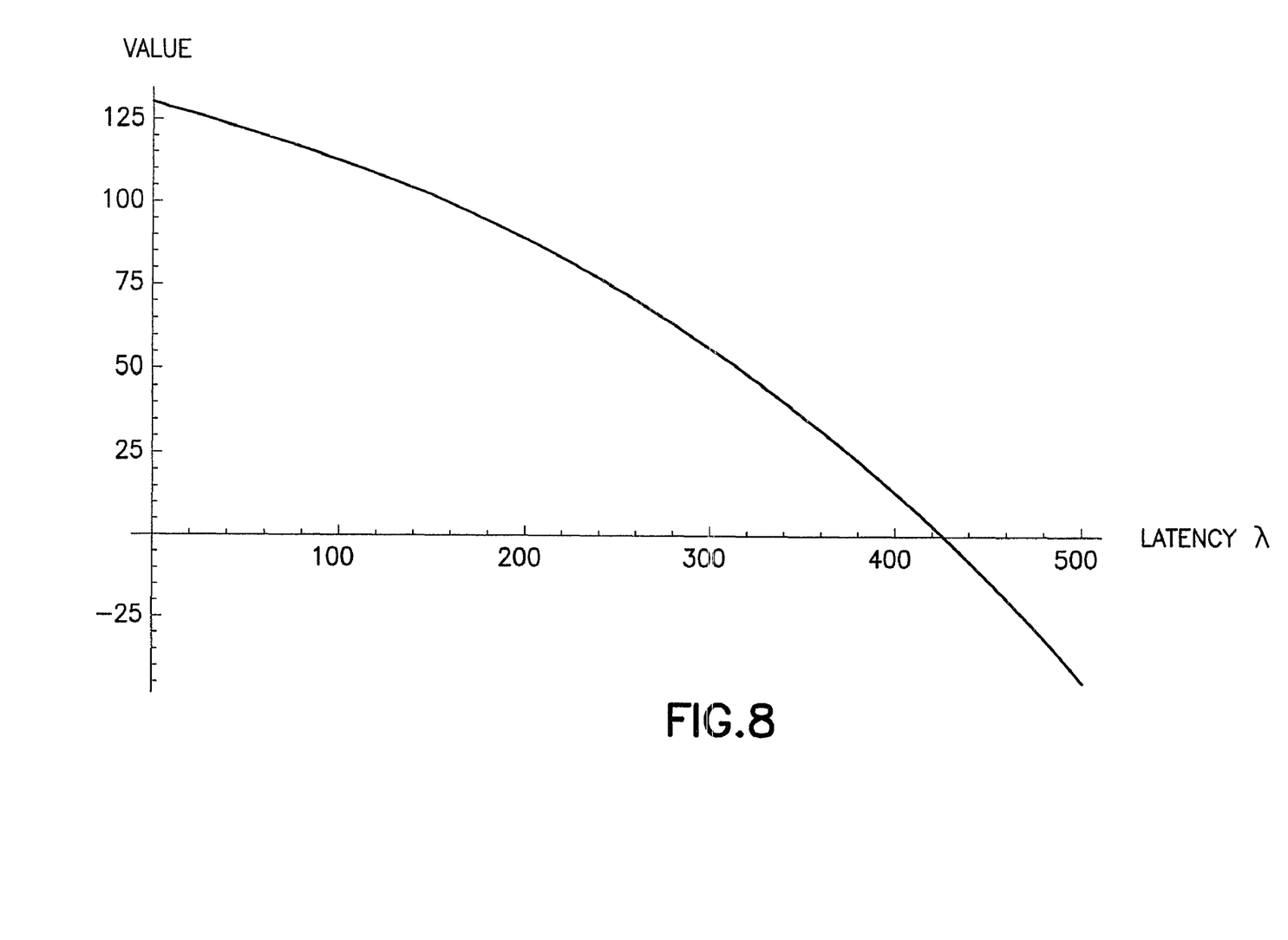
FIG. 8 depicts a latency-value curve.
Figure 9:
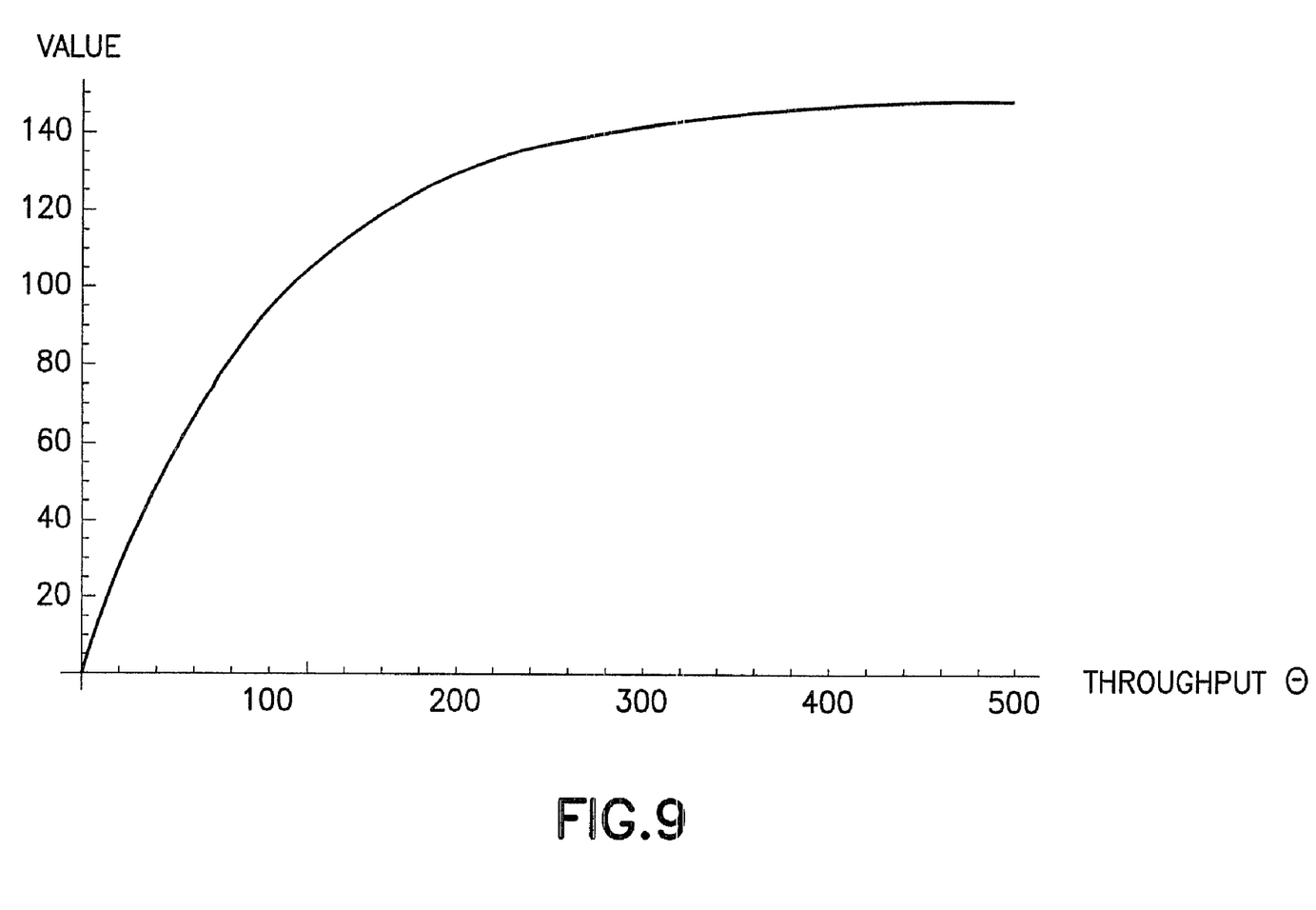
FIG. 9 depicts a throughput-value curve.
Figure 10:
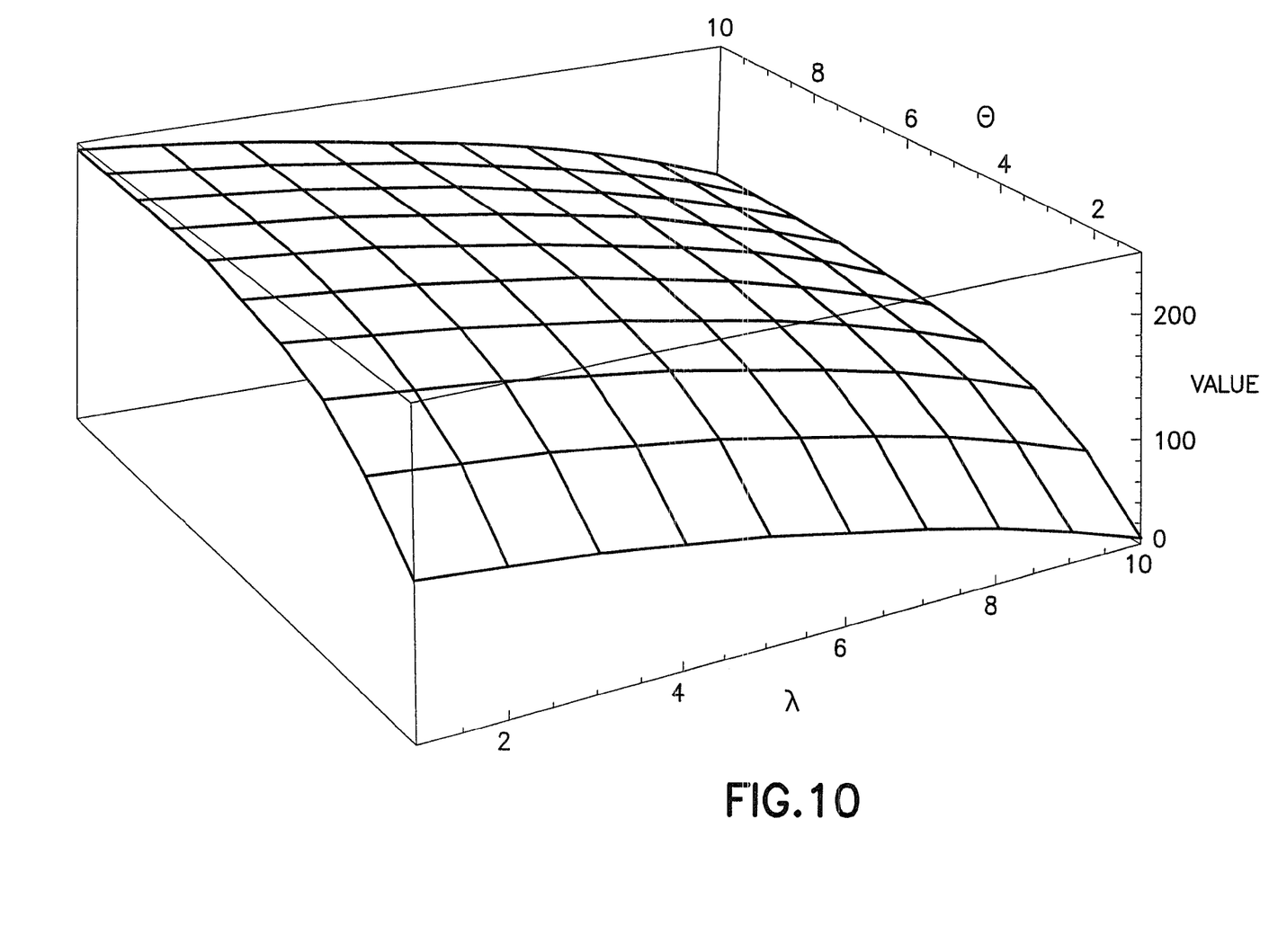
FIG. 10 depicts an objective value curve $\phi(\lambda(\pi), \theta(\pi))$.

This form of the objective function makes it easy to specify a custom throughput-latency trade-off for each (latency, throughput) point. An example function is shown in FIGS. 8, 9 and 10. A user can adjust the constants $c_1, \ldots c_4$ to achieve the best tradeoff for her application.

In practice, these constants would be chosen automatically by asking the user a series of questions of the form: "If your throughput is 100 and latency 50, which one would you prefer to improve?" Since each response determines the gradient of the throughput and the latency curves, with just a few responses the constants can be selected to fit the objective curve to the user's wishes.

To evaluate the quality of the heuristic solutions a good estimate of the optimal is required. One estimate, although often infeasible, can be computed from the ideal latency and ideal throughput as defined next.

Intuitively, the ideal latency between a publisher and a subscriber is along the shortest path in the topology between the location of the publisher and the location of the subscriber.

Similarly for throughput, the ideal throughput is achieved when all the task usage is spread evenly across all the processors, because the aggregate capacity is divided over the aggregate usage.

In practice, the ideal (latency, throughput) pair is not a feasible solution. However, it does provide a provable bound to measure feasible solutions against.

Definition. Let $P(i)$ and $S(i)$ be the set of publishers and the set of subscribers for subscription i respectively. Then an ideal latency for s is:

$$\lambda^*(\pi) \triangleq \max_{p \in P(i), s \in S(i)} l(\pi(p), \pi(s)) \quad (14)$$

Theorem. $\lambda^*(\pi)$ is a lower bound for subscription latency due to $\pi$.

Proof. Let $\pi$ be an assignment. Suppose there exists a pair $p' \in P$ and $s' \in S$ such that the $\Sigma_{(i,j) \in path(p',s')} \Gamma^M(i, j) \cdot l(\pi(i), \pi(j)) \leq \lambda^*(\pi)$ (the walk along the assigned path from p' to s' is shorter than $\lambda^*$). Contradiction, since $l(\pi(i), \pi(j))$ is defined to be the length of the shortest walk from p' to s' and by statement (14) $l(\pi(i), \pi(j)) \leq \lambda^*(\pi)$.

Definition. Let $\pi$ be an assignment. Then, $$\theta^*(\pi) \triangleq \frac{\sum_{r \in R} \hat{r}}{\sum_{t \in T} \Lambda(t) \cdot K} \quad (15)$$

Theorem (Throughput Bound): $\theta^*(\pi)$ is an upper bound for subscription throughput due to $\pi$.

Proof. Let $\pi'$ be an assignment with $\theta(\pi') > \theta^*$. Then, $$\min_{r \in R} \theta_r(\pi(r)) > \frac{\sum_{r \in R} \hat{r}}{\sum_{t \in T} \Lambda(t) \cdot K} \quad (16)$$

$$\min_{r \in R} \frac{\hat{r}}{\sum_{t \in \pi(r)} \Lambda(t) \cdot K} > \frac{\sum_{r \in R} \hat{r}}{\sum_{t \in T} \Lambda(t) \cdot K}$$

Let $a(\pi(r)) \equiv \sum_{t \in \pi(r)} \Lambda(t) \cdot K$, then $$\min_{r \in R} \frac{\hat{r}}{a(\pi(r))} > \frac{\sum_{r \in R} \hat{r}}{\sum_{t \in T} \Lambda(t) \cdot K} \quad (17)$$

Because t∈unique r $$\min_{r \in R} \frac{\hat{r}}{a(\pi(r))} > \frac{\sum_{r \in R} \hat{r}}{\sum_{r \in R} a(\pi(r))}. \quad (18)$$

Let $r_1 \in R$ be such that $$\frac{\hat{r}_1}{a(\pi(r_1))} = \min_{r \in R} \frac{\hat{r}}{a(\pi(r))}.$$

Then, $$\forall_{r \in R - r_1} \hat{r}_1 * a(\pi(r)) \leq \hat{r} * a(\pi(r_1)) \quad (19)$$

Then, from equation (14):

$$\hat{r}_1 * \sum_{r \in R} a(\pi(r)) > \sum_{r \in R} \hat{r} * a(\pi(r_1)) \quad (20)$$

But this contradicts equation (19) because every member of the sum on the LHS of (20) is less than or equal to its corresponding member on the RHS.

Thus, no such assignment $\pi'$ can exist and $\theta^*$ is an upper bound.

Since an exact solution is not practical except for very small instances, a heuristic approach is proposed based on several approximation techniques.

Like many methods for combinatorial optimization, the method of the present invention performs an iterative search of the solution space, seeking continuous improvement. Each generated solution $\pi$ is calculated in the methods and apparatus of the present invention by: first computing solution latency using equation (8), then throughput from equation (6) and finally the objective value via equation (13).

Since the latency computation is a type of quadratic assignment, local search techniques which have shown to be effective on small-size problem instances of QA are used. Simulated annealing, steepest descent and a genetic algorithm are used to explore solution neighborhoods.

The size of the input problem (number of processors and subscription tasks) is too large to search directly. For broker topology, a pre-processing clustering step that groups brokers into sites is applied. This approach (and its inverse) is outline in a foregoing section. For tasks a different approach is taken, performing placement of individual subscriptions (effectively batching the tasks) in a greedy way.

Clustering is a well-known technique in solving task-assignment problems. Clustering groups the processors that are "close" to each other so that they can be treated as a single entity. This reduces the complexity of the problem solved by the present invention because there are fewer placement choices for each task. In the placement problem model, being treated as a "single entity" means the capacities of all brokers assigned to a cluster are aggregated, forming a "site" with the combined total capacity.

Clustering algorithms vary in their clustering criteria—a function that is applied to nodes of a topology to determine whether they should be included in one cluster or another. For the present problem the latency between brokers is used as the clustering criteria and an algorithm is used to group brokers into sites. It is expected that broker clustering will work well for enterprise networks, which consist of local subnets at corporate sites connected by long-distance leased lines.

On the flip side for the placement problem a method is needed to de-cluster a solution. Namely, once a solution that assigns tasks to clusters has been determined, a method to assign tasks from the same cluster to the actual processors is needed. Within the cluster it is assumed that latency does not play a significant role and thus, the problem becomes to maximize throughput.

The theorem set forth previously regarding the throughput bound shows that throughput is maximized when the load is distributed as evenly as possible. The computational load balancing problem like this is often solved using graph partitioning methods known to those skilled in the art. (See, for example, G. Karypis and V. Kumar, "MeTis: Unstructured Graph Partitioning and Sparse Matrix Ordering System, Version 4.0", September 1998 [Online]. Available: http://www.c-s.umn.edu/~{}karypis/metis/metis/files/manual.ps; and B. Hendrickson and R. Leland, "The Chaco User's Guide Version 2", Sandia National Laboratories, Albuquerque, N. Mex., 1995 [Online]. Available: ftp://ftp.cs.sandia.goc/pub/papers/bahendr/guide.ps.gz.

The call Cluster Processors (R) in process 1 produces a clustering of broker topology by latency as described in the preceding section. It returns a new resource set $R_c$ and an all pairs shortest path matrix $l_c$ corresponding to the clustered topology.

The process SearchNeighborhood($\phi, \pi_s$) performs a local search by exploring the solution neighborhood of the given solution $\pi_s$. The three search techniques described herein are widely known. They work by permuting the solution, evaluating its value and comparing to the starting point. Depending on the heuristic, one of new solutions may be chosen as the best known maximum. All of the local search heuristics stop after a specified number of iterations and report their best solution.

The algorithm can support subscription priorities by placing the highest priority subscription first. The earlier a subscription is placed, the more likely it is to get better latency (artifact of the greedy approach).

---
Process 1: Placement
---

Data: $(\Gamma, R, P, S, \Lambda, K)$
Result: $\pi, X$
Begin
    $(R_c, l_c) \leftarrow$ Cluster Processors (R)
    for subscription $s \in S$ do
        for iteration $\leq$ MAXITER do
            $\pi_s \leftarrow$ Random Solutions(s)
            $\lambda \leftarrow$ Compute Latency($l_c, \Gamma_s^M, \pi_s, s$)
            $\theta \leftarrow$
            ComputeThroughput($\pi_s, R, K, \Lambda$)
            // Compute the objective function
            $\phi \leftarrow -e^{c_1 \lambda(\pi_s)} \cdot c_2 + (1 - e^{-c_3 \theta(\pi_s)}) \cdot c_4$
            $\pi_{max} \leftarrow$ Search Neighborhood($\phi, \pi_s$)
            $\pi_{total} \leftarrow$ Append($\pi_{total}, \pi_{max}$)
end ---
Process 2: Compute Latency
---

Data: $(l_c, \Gamma_i^M, \pi_s, s)$
Result: latency $\lambda$
Begin
    // Compute Longest Path ---
Process 2: Compute Latency
---

$\lambda_{max} \leftarrow 0$
for publisher $p \in P_s$ do
    for subscriber $s \in S_s$ do
        $\lambda_{max} \leftarrow \max(\lambda_{max}, \text{pLen})$
        for $(i, j) \in \text{path}(p,s)$ do
            pLen $\leftarrow \Gamma_i^M(i,j) * l_c(\pi_s(i), \pi_s(j))$
    return $\lambda_{max}$
end ---
Process 3: Compute Throughput
---

Data: $(\pi, R, K, \Lambda)$
Result: throughput $\theta$
Begin
    $\theta \leftarrow$ inf
    for processor $r \in R$ do
        for task $\tau \in \pi(r)$ do
            for $i = 1 \ldots n$ do
                usage+ = $\Lambda(\tau)(i) * K$         $\theta_r \leftarrow \dfrac{\hat{r}}{\text{usage}}$         $\theta \leftarrow = \min(\theta, \theta_r)$
    return $\theta$
end ---
Process 4: SearchNeighborhood
---

Data: $(\phi, \pi_s)$
Result: $\pi_{local\_max}$
Begin
    Switch searchType do
        $\pi_{local\_max} \leftarrow$
        Simulated Annealing ($\phi, \pi_s$) |
        $\pi_{local\_max} \leftarrow$ Steepest Descent ($\phi, \pi_s$) |
    return $\pi_{local\_max}$
end Thus it is seen that the foregoing description has provided by way of exemplary and non-limiting examples a full and informative description of the best methods and apparatus presently contemplated by the inventor for distributing stream transforms among broker machines comprising an overlay network in a publish-subscribe messaging system. One skilled in the art will appreciate that the various embodiments described herein can be practiced individually; in combination with one or more other embodiments described herein; or in combination with publish-subscribe messaging systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

What is claimed is:

1. A non-transitory memory medium tangibly embodying a program of machine-readable instructions executable by a digital processing apparatus of a computer system to perform operations controlling a publish-subscribe messaging system, where the publish-subscribe messaging system comprises publishing clients, subscribing clients, and a plurality of broker machines, the plurality of broker machines comprising an overlay network that accepts input message streams from publishing clients, transforms input message streams into output message streams according to pre-determined message transformation criteria, where the criteria are contained in message transforms implemented as software modules, the software modules being distributed among the broker machines, and then delivers the output message streams to the subscribing clients, the operations comprising:

selecting at least one performance parameter corresponding to a performance measure of the publish-subscribe messaging system;

monitoring a level of resource utilization of the overlay network;

making a provisional assignment of message transforms among the broker machines;

performing calculations to determine a value of the at least one performance parameter of the publish-subscribe messaging system in accordance with the provisional assignment of message transforms and the level of resource utilization of the overlay network; and determining that the provisional assignment of the message transforms among the broker machines results in an acceptable value of the at least one performance parameter and, assigning the message transforms among the broker machines in accordance with the provisional assignment;

wherein at least some of the message transforms comprise relational expressions for relating multiple ones of the input message streams, where the message transforms operate in a stateful manner such that the output message stream contains information derived from at least two messages culled from the multiple ones of the input message streams.

2. The memory medium of claim 1 where the operations further comprise, prior to determining the provisional assignment of the message transforms that results in acceptable value of the at least one performance parameter, making provisional assignments that do not result in an acceptable value of the at least one performance parameter:

continuing to make additional provisional message transform assignments among the broker machines and to calculate a value of the performance parameter corresponding to each of the additional provisional message transform assignments until an acceptable value of the performance parameter is reached; and assigning the message transforms among the broker machines in accordance with the provisional message transform assignment resulting in the acceptable value of the performance parameter.

3. The memory medium of claim 1 where the performance parameter is message throughput.

4. The memory medium of claim 1 where the performance parameter is message latency.

5. The memory medium of claim 1 where at least some of the message transforms operate on at least two input messages at a time to create a single output message for delivery to multiple ones of the subscribing clients.

6. The memory medium of claim 5, wherein at least one of the relational expressions comprises a JOIN operator which operates on the at least two input messages, and wherein the at least two input messages originate from at least two of the publishing clients.

7. The memory medium of claim 1 where the predetermined message transformation criteria are established by at least one message service provider.

8. The memory medium of claim 1:

where selecting at least one performance parameter further comprises selecting at least two performance parameters, a first performance parameter being message latency and a second performance parameter being message throughput;

where performing calculations further comprises:

determining values for message latency and message throughput based, at least in part, on the level or resource utilization of the overlay network; and calculating a value of an objective function based on values calculated for message latency and message throughput; and where determining that the provisional assignment of the message transforms among the broker machines results in an acceptable value of the performance parameter further comprises determining that the provisional assignment results in an acceptable value of the objective function.

9. The memory medium of claim 8 where the operations further comprise, prior to determining the provisional assignment of the message transforms that results in acceptable value of the objective function, making provisional assignments that do not result in an acceptable value of the objective function:

continuing to make additional provisional assignments among the broker machines and to calculate a value of the objective function corresponding to each of the additional provisional message transform assignments until an acceptable value of the objective function is reached, where the value of the objective function for each of additional provisional message transform assignments is based on calculations of message latency and message throughput for that provisional message transform assignment; and assigning the message transforms among the broker machines in accordance with the provisional message transform assignment resulting in the acceptable value of the performance parameter.

10. The memory medium of claim 1, wherein at least some of the relational expressions are derived from the subscribing clients.

11. A system for managing operations of an overlay network comprising a plurality of broker machines in a publish-subscribe messaging system, where the publish-subscribe messaging system comprises publishing clients, subscribing clients, and the plurality of broker machines, the plurality of broker machines comprising the overlay network that accepts input message streams from publishing clients, transforms input message streams into output message streams according to pre-determined message transformation criteria, where the criteria are contained in message transforms implemented as software modules, the software modules being distributed among the broker machines, and then delivers the output message streams to the subscribing clients, the system comprising:

at least one memory to store at least one program of machine-readable instructions, where the at least one program performs operations to distribute the message transforms among the broker machines;

a plurality of sensors to measure a level of resource utilization of the overlay network; and at least one processor coupled to the at least one memory, plurality of sensors and overlay network, where the at least one processor performs at least the following operations when executed:

selecting at least one performance parameter corresponding to a performance measure of the publish-subscribe messaging system;

monitoring the level of resource utilization of the overlay network;

making a provisional assignment of message transforms among the broker machines;

performing calculations to determine a value of the at least one performance parameter of the publish-subscribe messaging system in accordance with the provisional assignment of message transforms and the level of resource utilization of the overlay network;

determining that the provisional assignment of the message transforms among the broker machines results in an acceptable value of the at least one performance parameter; and assigning the message transforms among the broker machines in accordance with the provisional assignment;

wherein at least some of the message transforms comprise relational expressions for relating multiple ones of the input message streams, where the message transforms operate in a stateful manner such that the output message stream contains information derived from at least two messages culled from the multiple ones of the input message streams.

12. The system of claim 11 where the operations further comprise, prior to determining the provisional assignment of the message transforms that results in acceptable value of the at least one performance parameter, making provisional assignments that do not result in an acceptable value of the at least one performance parameter:

continuing to make additional provisional message transform assignments among the broker machines and to calculate a value of the performance parameter corresponding to each of the additional provisional message transform assignments until an acceptable value of the performance parameter is reached; and assigning the message transforms among the broker machines in accordance with the provisional message transform assignment resulting in the acceptable value of the performance parameter.

13. The system of claim 11 where the performance parameter is message throughput.

14. The system of claim 11 where the performance parameter is message latency.

15. The system of claim 11 where at least some of the message transforms operate on at least two input messages at a time to create a single output message for delivery to multiple ones of the subscribing clients.

16. The system of claim 15, wherein at least one of the relational expressions comprises a JOIN operator which operates on the at least two input messages, and wherein the at least two input messages originate from at least two of the publishing clients.

17. The system of claim 11 where the predetermined message transformation criteria are established by at least one message service provider.

18. The system of claim 11:

where selecting at least one performance parameter further comprises selecting at least two performance parameters, a first performance parameter being message latency and a second performance parameter being message throughput;

where performing calculations further comprises:

determining values for message latency and message throughput based, at least in part, on the level or resource utilization of the overlay network; and calculating a value of an objective function based on values calculated for message latency and message throughput; and where determining that the provisional assignment of the message transforms among the broker machines results in an acceptable value of the performance parameter further comprises determining that the provisional assignment results in an acceptable value of the objective function.

19. The system of claim 18 where the operations further comprise, prior to determining the provisional assignment of the message transforms that results in acceptable value of the objective function, making provisional assignments that do not result in an acceptable value of the objective function:

continuing to make additional provisional assignments among the broker machines and to calculate a value of the objective function corresponding to each of the additional provisional message transform assignments until an acceptable value of the objective function is reached, where the value of the objective function for each of additional provisional message transform assignments is based on calculations of message latency and message throughput for that provisional message transform assignment; and assigning the message transforms among the broker machines in accordance with the provisional message transform assignment resulting in the acceptable value of the performance parameter.

20. The system of claim 11, wherein at least some of the relational expressions are derived from the subscribing clients.

21. A processor-implemented method for use in a publish-subscribe messaging system, where the publish-subscribe messaging system comprises publishing clients, subscribing clients, and a plurality of broker machines, the plurality of broker machines comprising an overlay network that accepts input message streams from publishing clients, transforms input message streams into output message streams according to pre-determined message transformation criteria, where the criteria are contained in message transforms implemented as software modules, the software modules being distributed among the broker machines, and then delivers the output message streams to the subscribing clients, the method comprising:

selecting at least one performance parameter corresponding to a performance measure of the publish-subscribe messaging system;

monitoring a level of resource utilization of the overlay network;

making a provisional assignment of message transforms among the broker machines;

performing calculations to determine a value of the at least one performance parameter of the publish-subscribe messaging system in accordance with the provisional assignment of message transforms and the level of resource utilization of the overlay network;

determining that the provisional assignment of the message transforms among the broker machines results in an acceptable value of the at least one performance parameter; and assigning the message transforms among the broker machines in accordance with the provisional assignment;

wherein at least some of the message transforms comprise relational expressions for relating multiple ones of the input message streams,
where the message transforms operate in a stateful manner such that the output message stream contains information derived from at least two messages culled from the multiple ones of the input message streams.

22. The processor-implemented method of claim 21 further comprising, prior to determining the provisional assignment of the message transforms that results in acceptable value of the at least one performance parameter, making provisional assignments that do not result in an acceptable value of the at least one performance parameter:
continuing to make additional provisional message transform assignments among the broker machines and to calculate a value of the performance parameter corresponding to each of the additional provisional message transform assignments until an acceptable value of the performance parameter is reached; and
assigning the message transforms among the broker machines in accordance with the provisional message transform assignment resulting in the acceptable value of the performance parameter.

23. The processor-implemented method of claim 21 where the performance parameter is message throughput.

24. The processor-implemented method of claim 21 where the performance parameter is message latency.

25. The processor-implemented method of claim 21 where at least some of the message transforms operate on at least two input messages at a time to create a single output message for delivery to multiple ones of the subscribing clients.

26. The processor-implemented method of claim 25, wherein at least one of the relational expressions comprises a JOIN operator which operates on the at least two input messages, and wherein the at least two input messages originate from at least two of the publishing clients.

27. The processor-implemented method of claim 21 where the predetermined message transformation criteria are established by at least one message service provider.

28. The processor-implemented method of claim 21:
where selecting at least one performance parameter further comprises selecting at least two performance parameters, a first performance parameter being message latency and a second performance parameter being message throughput;
where performing calculations further comprises:
determining values for message latency and message throughput based, at least in part, on the level or resource utilization of the overlay network; and
calculating a value of an objective function based on values calculated for message latency and message throughput; and
where determining that the provisional assignment of the message transforms among the broker machines results in an acceptable value of the performance parameter further comprises deciding if the provisional assignment results in an acceptable value of the objective function.

29. The processor-implemented method of claim 28 where the operations further comprise, prior to determining the provisional assignment of the message transforms that results in acceptable value of the objective function, making provisional assignments that do not result in an acceptable value of the objective function:
continuing to make additional provisional assignments among the broker machines and to calculate a value of the objective function corresponding to each of the additional provisional message transform assignments until an acceptable value of the objective function is reached, where the value of the objective function for each of additional provisional message transform assignments is based on calculations of message latency and message throughput for that provisional message transform assignment; and
assigning the message transforms among the broker machines in accordance with the provisional message transform assignment resulting in the acceptable value of the performance parameter.

\* \* \* \* \*